(12) United States Patent
Grbac et al.

(10) Patent No.: US 10,354,348 B2
(45) Date of Patent: Jul. 16, 2019

(54) DIGITAL EVIDENCE MANAGEMENT

(71) Applicant: Hitachi Vantara Corporation, Santa Clara, CA (US)

(72) Inventors: Arno Grbac, Santa Clara, CA (US); Ankur Avlani, Sunnyvale, CA (US); Sathish Raghunathan, Santa Clara, CA (US); Sumeet Kumar Mittal, Santa Clara, CA (US)

(73) Assignee: Hitachi Vantara Corporation, Santa Clara, CA (US)

( * ) Notice: Subject to any disclaimer, the term of this patent is extended or adjusted under 35 U.S.C. 154(b) by 287 days.

(21) Appl. No.: 15/300,434

(22) PCT Filed: May 17, 2016

(86) PCT No.: PCT/US2016/032813
§ 371 (c)(1),
(2) Date: Sep. 29, 2016

(87) PCT Pub. No.: WO2017/200529
PCT Pub. Date: Nov. 23, 2017

(65) Prior Publication Data
US 2018/0144426 A1  May 24, 2018

(51) Int. Cl.
*G06F 16/907* (2019.01)
*G06Q 50/26* (2012.01)
*G06F 16/41* (2019.01)
*G06F 16/48* (2019.01)
*G06F 7/00* (2006.01)
(Continued)

(52) U.S. Cl.
CPC ........... *G06Q 50/26* (2013.01); *G06F 7/00* (2013.01); *G06F 16/41* (2019.01); *G06F 16/48* (2019.01); *G06Q 10/10* (2013.01); *G06Q 30/00* (2013.01); *G06Q 30/02* (2013.01)

(58) Field of Classification Search
CPC ......... G06F 17/30085; G06F 17/30082; G06F 17/30194; G06F 17/3028; G06F 17/30595; G06F 17/30106
See application file for complete search history.

(56) References Cited

U.S. PATENT DOCUMENTS 6,959,339 B1 * 10/2005 Wu .................. G06F 17/30864
707/999.003
2004/0167905 A1 * 8/2004 Eakin .................. G06F 16/972
(Continued)

OTHER PUBLICATIONS

International Search Report of PCT/US2016/032813 dated Aug. 12, 2016.

*Primary Examiner* — Daniel A Kuddus
(74) *Attorney, Agent, or Firm* — Mattingly & Malur, PC

(57) ABSTRACT

In some examples, analysis metadata may be generated for received digital assets based on analysis of content of the digital assets. As one example, a service computing device may receive and store a digital asset and first metadata for the digital asset. The service computing device may determining a content category of content of the digital asset, and may analyze the content of the digital asset based at least in part on the content category to obtain at least one analysis result as additional metadata for the digital asset. The service computing device may store the analysis result in association with the digital asset and may store analysis metadata in association with the first metadata.

19 Claims, 7 Drawing Sheets

(51) Int. Cl.
*G06Q 10/10* (2012.01)
*G06Q 30/00* (2012.01)
*G06Q 30/02* (2012.01)

(56) References Cited

U.S. PATENT DOCUMENTS

| | | | |
|---|---|---|---|
| 2005/0076042 A1* | 4/2005 | Stakutis | G06F 16/951 |
| 2005/0249374 A1* | 11/2005 | Levy | G11B 20/00086 |
| | | | 382/100 |
| 2006/0106834 A1* | 5/2006 | Blumenau | G06F 21/10 |
| 2007/0139231 A1* | 6/2007 | Wallia | H04L 63/1408 |
| | | | 341/50 |
| 2009/0248757 A1* | 10/2009 | Havewala | G06F 16/1873 |
| 2009/0292823 A1* | 11/2009 | King | G06F 16/258 |
| | | | 709/246 |
| 2013/0198242 A1* | 8/2013 | Levy | G06F 21/10 |
| | | | 707/803 |
| 2015/0278311 A1* | 10/2015 | Isherwood | G06F 12/1425 |
| | | | 707/741 |

\* cited by examiner

DIGITAL EVIDENCE MANAGEMENT

TECHNICAL FIELD

This disclosure relates to the technical field of data management and retention.

BACKGROUND

Law enforcement collects a large quantity of digital assets that may or may not be subsequently used as evidence during legal case proceedings. Examples of digital assets may include video/audio from body-worn cameras and automobile dash cameras, as well as other types of digital content, such as suspect/victim/witness interviews, telephone call recordings, radio recordings, dispatch data, license plate reader information, crime scene photos and videos, vehicle location data, gunshot detection system information, information maintained in cloud storage, Global Positioning System (GPS) information, vehicle computer system information, third party surveillance video, social network and microblog information, data obtained from computers and mobile devices, and so forth.

Storage of these digital assets for certain mandated retention periods requires very large amounts of digital storage capacity. In addition, a basic requirement of evidence management is that the evidence related to an event is securely maintained so that the evidence can be used to prove the circumstances of the event. Accordingly, the digital assets must be stored securely with a clear chain of custody to prevent tampering or other changes to the digital assets. Further, some types of digital assets may need to be stored for different lengths of time from others. For example, digital assets that are used as evidence may need to be archived indefinitely, while other digital assets may only need to be stored for shorter lengths of time.

SUMMARY

Some implementations include techniques and arrangements for managing digital assets and generating metadata based on analysis of content of the digital assets. As one example, a service computing device may receive and store a digital asset and first metadata. The service computing device may determine a content category of content of the digital asset, and may analyze the content of the digital asset based at least in part on the content category to obtain at least one analysis result as additional metadata for the digital asset. The service computing device may storing the analysis result in association with the digital asset and may store analysis metadata for the analysis result in association with the first metadata.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
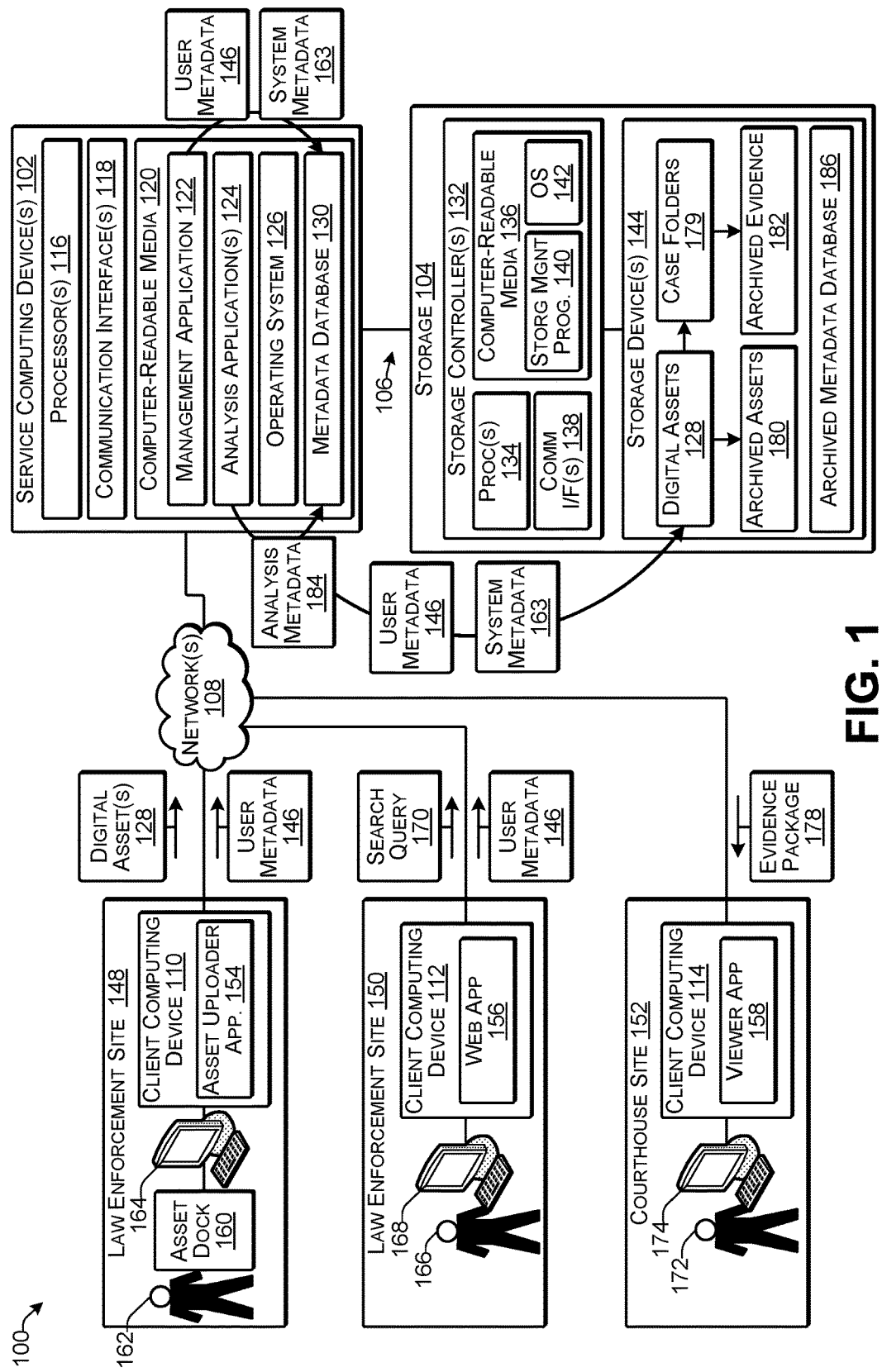
FIG. 1 illustrates an example architecture of a system enabling digital evidence management according to some implementations.

Some implementations herein are directed to techniques and arrangements for receiving digital assets and enabling metadata to be generated for and/or appended to the digital assets. In examples herein, metadata may be data that describes or give information about other data, such as a digital asset. For instance, at a data ingestion stage, authenticated users may append metadata to individual digital assets and associate the individual assets with other digital assets and/or with case folders. The management system herein may maintain the integrity of the digital assets and may transfer the digital assets to a secure storage location. At the storage location, the management system may enable programmatic digital data analysis for extracting or otherwise generating additional metadata. For instance, through analysis of a digital asset, various types of analysis metadata may be automatically determined from a digital asset and associated with the original unaltered digital asset. Further, the management system may handle the flow and routing of digital assets from an ingestion point to storage, archiving, consolidating, and delivery to an endpoint (e.g., to a courtroom, prosecuting attorney, defense attorney, court clerk, or the like) in an automatic and secure manner.

As one example, the management system may enable identification and storage of digital assets as the digital assets enter the management system. Further, the management system may control movement of and access to the digital assets within the system in accordance with chain of custody rules. In addition, the management system may enable digital asset metadata tagging and secure transfer and routing of digital assets between various data ingest points, storage locations, archive locations, and delivery endpoints that are part of the evidentiary ecosystem. Thus, implementations herein provide the ability to consolidate and add metadata to digital assets as the digital assets enter the evidentiary system, and further manage access to the digital assets within the system in accordance with chain of custody rules.

Some examples include an uploader application that enables a law enforcement officer or other authorized personnel to add metadata that is associated with an ingested digital asset. The added metadata may be associated with the digital asset without changing the digital asset itself. Additionally, the uploader application may provide a feature for auto-sending ingested digital data to a digital evidence management application. In addition, a web application may enable additional metadata to be associated with a selected digital asset and/or may enable a digital asset to be added to a case folder. Further, a viewer application may be employed in some cases to enable read-only viewing of case folders or other information included in an evidence package.

Some examples may be applied to digital evidence management, such as may be employed by law enforcement agencies. For instance, with the addition of body cameras to many police departments, police department are being force to manage an ever-increasing amount of digital data. Accordingly, the management system herein may handle digital asset ingestion, sharing the digital assets in a secure manner with multiple resources or entities, associating metadata with the digital assets, creating new metadata for the digital assets through various types of analysis of the digital assets, and may provide the ability to search a large number of stored digital assets, such as based on metadata associated with the respective digital assets.

In addition, implementations herein may enable automated management of retention periods for the digital assets. For example, if a digital asset does not become classified as digital evidence within a first threshold time period, the digital asset may be moved to an archived location, and may be deleted entirely after a second period of time. On the other hand, if the digital asset is classified as evidence, e.g., by being added to at least one case folder, the digital asset may be retained for a third time threshold, after which the digital asset may be moved to an evidence archive and retained for a fourth time threshold.

For discussion purposes, some example implementations are described in the environment of one or more computing devices in communication with one or more storage locations and one or more client devices for performing digital evidence management. However, implementations herein are not limited to the particular examples provided, and may be extended to other types of computing systems, other types of storage environments, other system architectures, other types of data management, and so forth, as will be apparent to those of skill in the art in light of the disclosure herein.

FIG. 1 illustrates an example architecture of a system 100 configured for digital evidence management according to some implementations. The system 100 includes a least one service computing device 102 that is able to communicate with, or is otherwise coupled to, a storage 104, through a connection 106, such as a direct connection or through one or more networks. Further, the service computing device 102 may be able to communicate over one or more networks 108 with one or more client computing devices 110, 112, and 114, such as user devices or other computing devices that may access or otherwise communicate with the service computing device 102.

In some examples, the service computing device 102 may include one or more servers or other types of computing devices that may be embodied in any number of ways. For instance, in the case of a server, the modules, applications, other functional components, and at least a portion of data storage may be implemented on at least one server, such as in a cluster of servers, a server farm or data center, a cloud-hosted computing service, and so forth, although other computer architectures may additionally or alternatively be used. In the illustrated example, the service computing device 102 includes, or may have associated therewith, one or more processors 116, one or more communication interfaces 118, and one or more computer-readable media 120.

Each processor 116 may be a single processing unit or a number of processing units, and may include single or multiple computing units, or multiple processing cores. The processor(s) 116 may be implemented as one or more central processing units, microprocessors, microcomputers, microcontrollers, digital signal processors, state machines, logic circuitries, and/or any devices that manipulate signals based on operational instructions. For instance, the processor(s) 116 may be one or more hardware processors and/or logic circuits of any suitable type specifically programmed or configured to execute the algorithms, applications, and processes described herein. The processor(s) 116 may be configured to fetch and execute computer-readable instructions stored in the computer-readable media 120, which can program the processor(s) 116 to perform the functions described herein.

The computer-readable media 120 may include volatile and nonvolatile memory and/or removable and non-removable media implemented in any type of technology for storage of information such as computer-readable instructions, data structures, program modules, or other data. For example, the computer-readable media 120 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 120 may be a tangible non-transitory medium to the extent that, when mentioned, non-transitory computer-readable media exclude media such as energy, carrier signals, electromagnetic waves, and/or signals per se. In some cases, the computer-readable media 120 may be at the same location as the service computing device 102, while in other examples, the computer-readable media 120 may be partially remote from the service computing device 102.

The computer-readable media 120 may be used to store any number of functional components that are executable by the processor(s) 116. In many implementations, these functional components comprise instructions or programs that are executable by the processor(s) 116 and that, when executed, specifically program the processor(s) 116 to perform the actions attributed herein to the service computing device 102. Functional components stored in the computer-readable media 120 may include a management application 122, one or more analysis applications 124, and an operating system (OS) 126. The management application 122 may include a number of functional components for performing various digital asset storage and processing tasks, each of which may include one or more computer programs, applications, executable code, computer-readable instructions, or portions thereof. For example, the management application 122 may be executable to securely receive and store one or more digital assets 128, provide access to the digital assets 128, maintain a chain of custody log of the digital assets 128, associate metadata with the digital assets 128, determine a storage protocol for each digital asset 128, and provide requested digital assets 128 to an endpoint.

The analysis application(s) 124 may perform analysis on received digital assets 128 to generate additional analysis metadata for the respective digital assets 128. For example, in the case of a video digital asset, one or more analysis applications 124 may perform various recognition processes such as facial recognition, object recognition, license plate recognition, and so forth. The generated analysis result information may be maintained and associated with the particular digital asset as analysis metadata for the particular digital asset. Numerous other types of analytics may be performed by the analysis application(s) 124, as discussed additionally below.

Furthermore, the operating system 126 may control and manage various functions of the service computing device 102. Depending on the operating system used, additional components or modules may be employed for running the software herein. As one example, a plurality of virtual machines may be employed for running the various modules, applications, and other functional components described herein. As still another example, multiple physical service computing devices 102 may run some or all of the various modules and functional components described herein. In some cases, the functional components may be stored in a storage portion of the computer-readable media 120, loaded into a local memory portion of the computer-readable media 120, and executed by the one or more processors 116. Numerous other software and/or hardware configurations will be apparent to those of skill in the art having the benefit of the disclosure herein.

In addition, the computer-readable media 120 may store data and data structures used for performing the functions and services described herein. For example, the computer-readable media 120 may store a metadata database 134 maintaining metadata associated with individual ones of the digital assets 128 stored in the storage 104. For example, the service computing device 102 may receive user-provided metadata from law enforcement personnel or other authorized personnel and may associate the received metadata with a digital asset 128 that is a target of the received metadata in the metadata database 130. In addition, the analysis applications 124 may also generate analysis results as metadata associated with particular digital assets 128 and metadata for the analysis results may also be maintained in the metadata database 130 in association with the other metadata for the particular digital asset. The service computing device 102 may also include or maintain other functional components and data, which may include programs, drivers, etc., and other data used or generated by the functional components. Further, the service computing device 102 may include many other logical, programmatic, and physical components, of which those described above are merely examples that are related to the discussion herein.

The communication interface(s) 118 may include one or more interfaces and hardware components for enabling communication with various other devices, such as over the connection/networks 106 and the network(s) 108. Thus, the communication interfaces 118 may include, or may couple to, one or more ports that provide connection to the connection 106 for communicating with the storage system 104, and one or more ports that provide connection to the network(s) 108 for communication with the client devices 110-114. For example, the communication interface(s) 118 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein. In addition, for increased fault tolerance, the communication interfaces 118 of each service computing device 102 may include redundant network connections to each of the networks to which the service computing device 102 is coupled.

The storage 104 may provide storage capacity for the system 100 for storage of data, such as file data or other object data, and which may include the digital assets 128. The storage 104 may include storage arrays such as network attached storage (NAS) systems, storage area network (SAN) systems, or storage virtualization systems. Further, the storage 104 may be co-located with one or more of the service computing devices 102, and/or may be remotely located or otherwise external to the service computing devices 102.

In the illustrated example, the storage 104 includes one or more storage computing devices referred to as storage controller(s) 132, which may include one or more servers or any other suitable computing devices, such as any of the examples discussed above with respect to the service computing device 102. The storage controller(s) 132 may each include one or more processors 134, one or more computer-readable media 136, and one or more communication interfaces 138. For example, the processor(s) 134 may correspond to any of the examples discussed above with respect to the processors 116, the computer-readable media 136 may correspond to any of the examples discussed above with respect to the computer-readable media 120, and the communication interfaces 138 may correspond to any of the examples discussed above with respect to the communication interfaces 118.

Further, the computer-readable media 136 of the storage controller 132 may be used to store any number of functional components that are executable by the processor(s) 136. In many implementations, these functional components comprise instructions, modules, or programs that are executable by the processor(s) 134 and that, when executed, specifically program the processor(s) 134 to perform the actions attributed herein to the storage controller 132. Functional components stored in the computer-readable media 136 may include a storage management program 140 and an OS 142, each of which may include one or more computer programs, applications, executable code, computer-readable instructions, or portions thereof. For example, the storage management program 140 may control or otherwise manage the storage of the digital assets in a plurality of storage devices 144 coupled to the storage controller 132. The OS 142 may control and manage various functions of the storage controller 132.

The storage devices 144 may be any type of storage device, such as hard disk drives, solid state devices, optical devices, magnetic tape, and so forth, or combinations thereof. In addition, the storage devices 144 may, in some cases, include one or more arrays of physical storage devices, or the like. For instance, the storage controller 132 may control one or more arrays, such as for configuring the arrays in a RAID (redundant array of independent disks) configuration or other desired storage configuration. The storage controller 132 may present logical units based on the physical devices to the service computing device(s) 102, and may manage the data stored on the storage devices 144. Additionally, in some examples, the storage 104 may include thin-provisioning capability configured to provide on-demand storage capacity, may include failover protection, automated replication, backup, archiving, and the like.

In the illustrated example, the storage controller(s) 132 and the storage devices 144 are configured to act as an object data storage system for the service computing device 102. In addition, the service computing device 102 may maintain a local storage as part of the computer-readable media 120 for maintaining the metadata database 130 to enable fast searching and access to the metadata database 130. The management application 122 on the service computing device 102 may be executed to receive and store digital assets 128 and/or user metadata 146 from the client devices 110-114 and/or subsequently retrieve and provide the digital assets and associated metadata to the client devices 110-114. Further, the service computing devices 102 and the client devices 110-114 may include any number of distinct computer systems, and implementations disclosed herein are not limited to a particular number of computer systems or a particular hardware configuration.

Each client computing device 110-114 may be any suitable type of computing device such as a desktop, workstation, server, laptop, tablet computing device, mobile device, smart phone, wearable device, or any other type of computing device able to send data over a network. In some cases, the client computing devices 110-114 may include hardware configurations similar to that described for the service computing device 102, but with different data and functional components to enable them to perform the various functions discussed herein. In some cases, a user may be associated with a respective client device 110-114, such as through a user account, user login credentials, badge number, a particular asset providing device identifier (ID), or the like. In some examples, the client devices 110-114 may access the service computing device 102 through an application, such as a browser-based application, or other application executed on the respective client device 110-114. Examples of the applications for performing various functions according to some implementations herein are discussed additionally below. Furthermore, the client devices 110-114 may be able to communicate with the service computing device 102 through the one or more networks 108 or through any other suitable type of communication connection. Additionally, while one example of a client-server configuration is described herein, numerous other possible variations and applications for the computing system 100 herein will be apparent to those of skill in the art having the benefit of the disclosure herein.

The one or more networks 108 (and the connection 106 in the case that the connection 106 includes a network) may include any suitable network, including a wide area network, such as the Internet; a local area network, such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 108 may include both wired and/or wireless communication technologies. Components used for such communications can depend at least in part upon the type of network, the environment selected, or both. Protocols for communicating over such networks are well known and will not be discussed herein in detail; however, typically a secure and/or encrypted protocol may be employed, such as secure FTP (file transfer protocol), or the like. Accordingly, the service computing device 102 and client device 110 are able to communicate over the one or more networks 108 using wired or wireless connections, and combinations thereof.

The example of FIG. 1 illustrates several possible sites that may access or otherwise communicate with the service computing device 102, including a first law enforcement site 148, a second law enforcement site 150, and a courthouse site 152, although implementations herein are not limited to the particular sites illustrated. For instance, suppose that the first client computing device 110 is located at the first law enforcement site 148, the second client computing device 112 is located at the second law enforcement site 150, and third client computing device 114 is located at the courthouse site 152. Further, suppose that the first client computing device 110 includes an asset uploader application 154, the second client computing device includes a web application 156, and the third client computing device 114 includes a viewer application 158. In some examples, the applications 154-158 may each be different modules of the same application, may be separate applications that are unrelated to each other, or any combination thereof. Furthermore, while the respective applications 154-158 are shown on particular client computing devices 110-114, some or all of these and/or other applications may also be included on the other respective client computing devices 110-114.

The asset uploader application 154 may be configured to receive a digital asset and upload or otherwise send the digital asset to the service computing device 102. As one example, an asset dock 160 may be connected to the client computing device 110 to enable a law enforcement officer or other user 162 to offload digital assets 128 to the client computing device 110 to be subsequently sent to the storage computing device 102 for storage and archiving. For instance, in the case of a body-worn camera (not shown in FIG. 1), the user 162 may be a law enforcement officer who has finished a shift and who is transferring data from the body-worn camera to the client computing device 110. The asset uploader application 154 may detect or may receive an ID associated with the user 162 (e.g., a badge ID) and/or an ID associated with the camera (e.g., a camera ID), and may automatically associate the ID with the digital asset 128 that is uploaded as user metadata 146 for the digital asset 128. In some examples, the law enforcement site 148 may be at a police station, in a patrol car, or at another suitable location for the user 162 to upload the digital asset 128 to the service computing device 102.

Based on the associated ID or based on other metadata information entered by the user 162, as discussed below, the management application 122 may receive the digital asset 128, may place the digital asset 128 into the storage 104, and may generate system metadata 163 for the digital asset 128. The system metadata may include system-managed properties describing the data, such as the storage size of the digital asset 128, a timestamp at which the digital asset was received by the service computing device 102, policy settings, such as a retention policy and data protection level, which may affect how internal processes interact with the digital asset 128, the storage location or other storage information, the ID or other owner information associated with the digital asset 128, and other information such as the mime type (e.g., file type) of the digital asset 128, and so forth.

The management application 122 may store the system metadata 163 in the metadata database 130, such as in association with the storage location of the particular digital asset 128, and, in some examples, may assign a particular file name to the digital asset 128. Furthermore, the system metadata 163 and the user metadata 146 may also be stored in the storage 104 in association with the respective digital asset 128, as discussed additionally below, e.g., with respect to FIG. 7. In some instances, the management application 122 may automatically generate a file name for the digital asset having a first portion that is unique or otherwise individually distinguishable within the system with respect to file names of other digital assets stored within the system 100. As one example, the file name may be partially based on the ID associated with the digital asset 128, or may be generated according to any other suitable file naming scheme. As second portion of the file name may be a file extension, such as a mime type of the digital asset. Furthermore, in some cases, a checksum may be generated for each received digital asset and may be stored with the system metadata 163 in the metadata database 130. The checksum may be used to help ensure that the digital asset 128 is not changed or otherwise tampered with after the digital asset 128 has been received by the service computing device 102 and stored in the storage 104.

In some examples, the user 162 may further use a graphic user interface (GUI) 164 presented by the asset uploader application 154 to provide user metadata 146 related to the digital asset 128 being uploaded. Examples of such user metadata 146 may include a case number or other case information that may correspond to at least a portion of the digital asset 128. Upon receiving the user metadata 146, the management application 122 may store the user metadata 146 in the metadata database 130 and in the storage 104 in association with the particular digital asset 128. Each user 162 may upload more than one digital asset 128, depending upon the types of digital assets 128 collected by the user 162, or other users. Examples of digital assets 128 may include video/audio from body-worn cameras; video/audio from automobile dash cameras; recordings of telephone calls and call logs; radio recordings; computer-aided dispatch data; suspect/victim/witness interview recordings and videos; license plate reader information; crime scene photos and videos; vehicle location data; gunshot detection system information; third party surveillance video; information maintained in cloud storage; Global Positioning System (GPS) information; vehicle computer system information; social network and microblog data; data obtained from computing devices, such as social media applications, browser search caches, email messages, calendars, contact lists, Internet service provider connectivity data, and VoIP calling information; and data obtained from mobile devices, such as SIM chip information, calling logs, GPS maps, photo geotagging data, application data and metadata, email messages, calendars and contact lists. Further, while some examples of digital assets are provided above implementations herein are not limited to these particular examples.

The second client computing device 112 at the law enforcement site 150, such as at a police station, prosecuting attorney's office, or the like, may include a web application 156 that a user 166 may use for providing user-provided metadata 146. In some examples, the user 166 may be the same user as the user 162 who uploaded the digital asset. In other examples, the user 166 may be a different user such as other law enforcement personnel, a prosecuting attorney, or the like. As one example, the user 166 may access the web application 156 to view a GUI 168. For instance, the GUI 168 may present a search and/or browsing screen to enable the user 166 to locate and view or otherwise access a particular digital asset 128, such as by sending a search query 170 to the management application 122. In response to the search query 170, the management application 122 may provide information to at least partially cause the GUI 168 to present information to enable the user 166 to enter user metadata 146 about the particular digital asset 128. For example, the user 166 may provide police report information or other additional information not previously provided that is related to the particular digital asset 128. Additionally, in some cases, the web application 156 may include the same or similar functionality as the asset uploader application 154, and may also enable a user to send additional digital assets to the service computing device 102 in addition to adding user metadata 146 for digital assets that have already been uploaded to the service computing device 102.

Furthermore, the third client computing device 114 in this example may be located at the courthouse site 152 and may include the viewer application 158, which may be accessed by a user 172. In some examples, the user 172 may be a prosecuting attorney, law enforcement personnel, court clerk, defense attorney, or other authorized user permitted to access the information stored by the service computing device 102. For instance, the user 172 may desire to obtain an evidence package including one or more of the digital assets 128. The viewer application 158 may present a GUI 174 that the user 172 may use to view an evidence package 178 that may be pushed or otherwise sent to the viewer application 158 by the management application 122. For example, the management application 122 may assemble an evidence package 178 for a particular case. The management application 122 may send the evidence package 178 to the client computing device 114 to at least partially cause the viewer application 158 to present the evidence package 178 via the GUI 174. For instance, the evidence package 178 may include at least one case folder 179 having one or more digital assets associated therewith, and at least a portion of metadata associated with the digital assets in the case folder 179, such as chain of custody information, and any analysis results, as discussed additionally below.

In some examples, the viewer application 158 may limit user access to read-only access. For instance, the network at the courthouse site 152 may be less secure than the network at the law enforcement sites 148 and 150. Additionally, or alternatively, the user 172 may not be authorized to make changes to the evidence package 179 and/or may only be authorized to view certain digital assets. Accordingly, the viewer application 158 may provide built-in security by limiting access to the digital evidence to read-only access.

Not all digital assets 128 may become evidence. For instance, a large number of digital assets 128, or portions thereof, may never become evidence. Accordingly, the service computing device and/or the storage 104 may enforce a retention policy with respect to the stored digital assets. For example, after expiration of a first threshold period of time, the digital assets 128 that have not become associated with a legal case, or otherwise have not become evidence, may be archived as archived digital assets 180. For instance, the archived digital assets 180 may be maintained for a second threshold period of time before being discarded. The second threshold period of time may be a period of time mandated by local law enforcement policy, state law enforcement rules, state evidence rules, federal rules, or the like, depending on the source and type of the digital assets.

On the other hand, certain ones of the digital assets 128 may be associated with a respective legal case and may be included in a case folder 179 corresponding to the legal case. For instance, the user 162, 166, or 172 may create a legal case and may select a particular digital asset as evidence for that case. Thus, the selected digital asset 128 may be moved into or otherwise associated with a digital case folder 179 for that legal case. In some examples, the selected digital asset may be moved from a first location in storage 104 designated for digital assets that have not been classified as evidence, to as second location in storage 104 designated for storage of digital assets that have be classified as digital evidence. Thus, by movement of the selected digital asset to the case folder 179, the retention policy for the selected digital asset may be automatically changed to the retention policy applicable to digital evidence.

As another example, the digital asset 128 might not be physically moved in the storage 104, but rather, the metadata for the particular digital asset 128 in the metadata database 130 may be updated to indicate that the particular digital asset 128 is associated with a particular case folder 179. After a particular digital asset 128 becomes associated with at least one case folder 179, the digital asset becomes digital evidence, and the retention period for that digital asset may be changed to correspond to the retention policy for digital evidence.

In either example, the case folder 179 and any associated digital assets 128 may be retained in storage for a third threshold period of time, such as for a threshold period of time after the corresponding legal case has reached a final conclusion or other final resolution. Subsequently, after the third threshold period of time has expired, the case folder 179 and the digital evidence associated therewith may be moved to archived evidence 182. For instance, the archived evidence 182 may be maintained for a fourth threshold period of time before being deleted. The fourth threshold period of time may be a period of time mandated by court evidence rules, state evidence rules, state law enforcement rules, federal rules, or the like, depending on the source and type of the archived evidence 182.

Further, as discussed additionally below, some or all of the digital assets 128 that are ingested into the storage 104 may be subject to analysis by the analysis application(s) 124. For instance, depending on the content category of the digital asset, the analysis application(s) 124 may generate analysis metadata 184 for certain ones of the digital assets 128. For example, the management application 122 may detect a mime type of a particular digital asset 128, or may otherwise determine a content category of the particular digital asset 128, and may cause execution of one or more analysis applications 124 based on the detected content category. As an example, if the content category is a video file, the analysis applications that are executed may include facial recognition, object recognition, license plate recognition, event detection, video tracking, motion detection, or the like. If the mime type is an audio file, the analysis applications that are executed may include sound recognition, voice-to-text translation, voice print recognition, and so forth. The generation of the analysis metadata 184 is discussed additionally below. In some situations, the analysis applications 124 may perform analysis on some or all of the ingested digital assets. In other situations, the analysis applications 124 may perform analysis on selected digital assets, such as based on instructions received from a user through one of the GUIs 164, 168, or 174, or such as based on a particular digital asset being associated with case folder 179, or based on other criteria. In some examples, analysis metadata 184 that is in file form may be stored in the storage 104 with the corresponding digital asset 128, while metadata for the analysis metadata files may be stored in the metadata database 130.

Furthermore, as digital assets 128 are moved to the archived assets 180, and/or as particular case folders 179 are moved to archived evidence 182, the corresponding metadata from the metadata database 130 may also be archived. For example, the archived metadata may be moved from the metadata database 130 on the computer-readable media 120 on the service computing device 102, to an archived metadata database 186 in the storage 104. Subsequently, as the archived assets 180 and/or the archived evidence 182 are timed out of the storage 144 and deleted, such as through expiration of the second threshold period of time for the archived assets 180 or expiration of the fourth threshold period of time for the archived evidence 182, the corresponding archived metadata may be deleted from the archived metadata database 186.

FIGS. 2 and 4-7 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 2:
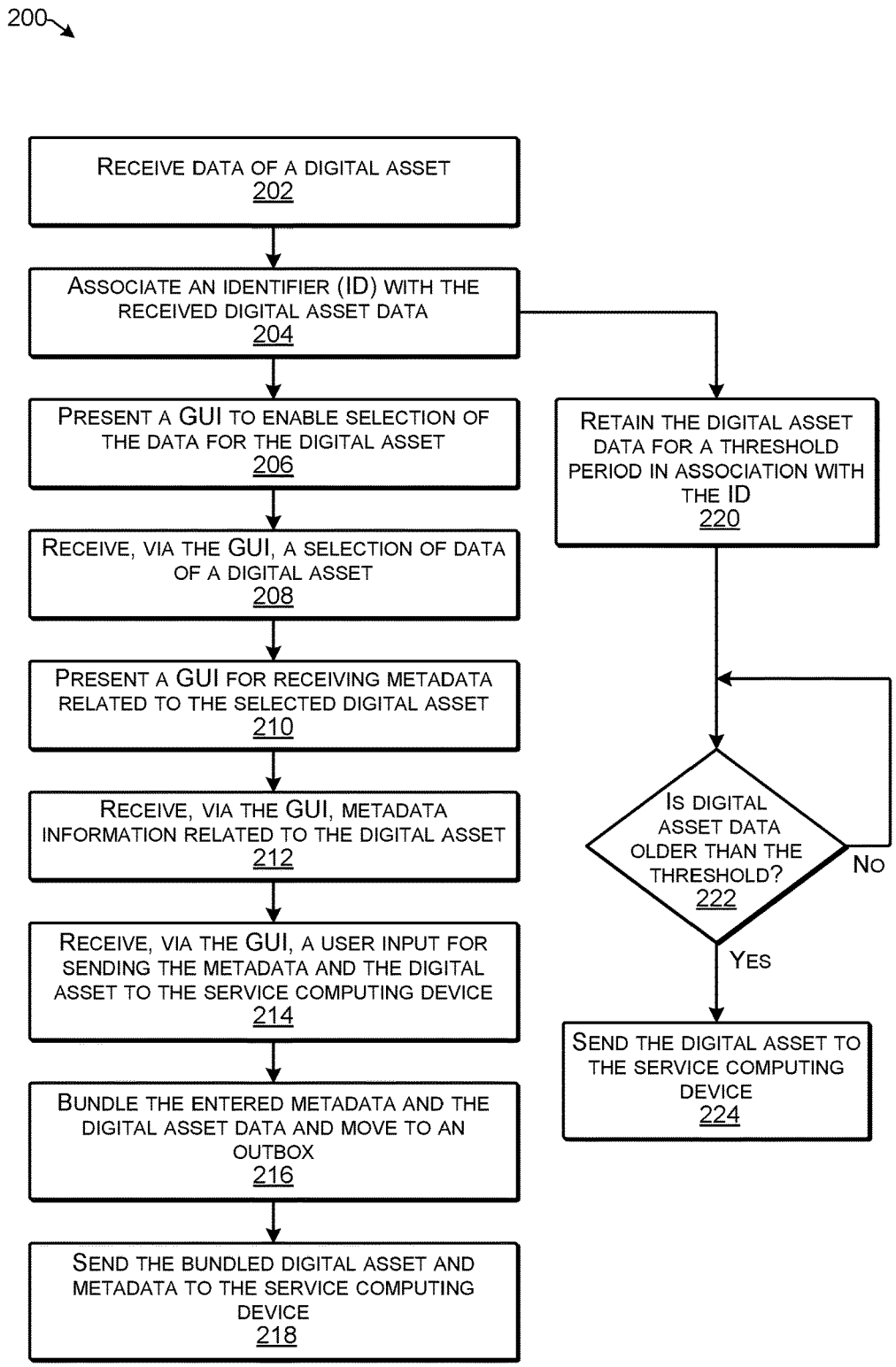
FIG. 2 illustrates an example process that may be executed for sending a digital asset and associated metadata to the service computing device according to some implementations.

FIG. 2 illustrates an example process 200 that may be executed for sending a digital asset and associated metadata to the service computing device according to some implementations. In some examples, the process 200 may be executed by a client computing device or other suitable computing device.

At 202, the computing device may receive data of a digital asset. For example, the uploader application on a client computing device may receive a digital asset through offloading from another device, either through a direct connection, an asset dock, a removable medium, a network connection, or the like. As one example, such as in the case of a body-worn camera, a user may dock the camera to the client computing device, and software on the camera may push the data corresponding to the digital asset to the client computing device.

At 204, the computing device may associate an ID with the received data. For example, the digital asset may be received as a file or may, in some cases, be assembled into a file, such as a common file type, depending on the mime type of the digital asset. Further, the computing device may receive an ID to associate with the digital asset. For instance, the user may enter an ID, such as a badge ID, or other ID via a GUI. Alternatively, the computing device or an intermediary docking device may detect an ID associated with the user or with the source of the digital asset, such as a camera ID, log ID, or the like.

At 206, the computing device may present a GUI to enable selection of the data for the digital asset. For example, the user may use the GUI to select at least a portion of data of a particular digital asset that has been provided to the asset uploader application.

At 208, the computing device may receive, via the GUI, selection of data of a digital asset. For instance, if the user has provided several different portions of data or several different digital assets to the uploader application, the user may select a particular portion of data or multiple portions of data for entry of metadata for creation of a digital asset and associated metadata.

At 210, the computing device may present a GUI for receiving metadata related to the selected digital asset. As one example, the GUI may include a form for the user to enter metadata for the selected digital asset as discussed additionally below with respect to FIG. 3.

At 212, the computing device may receive, via the GUI, metadata information related to the digital asset. For instance, the user may use the GUI to enter metadata, such as for assigning a case number, for adding metadata tags to the digital asset, for adding case notes, time information, or the like.

At 214, the computing device may receive, via the GUI, a user input for sending the metadata and the digital asset to the service computing device. For example, when the user has finished entering the desired metadata, the user may click on a submit button or other virtual control for submitting the metadata and the digital asset to the service computing device.

At 216, in some examples, the computing device may bundle the entered metadata and the digital asset data and move the bundle to an outbox. As one example, the computing device may combine the metadata and the digital asset data into a zip file and places it file into an outbox or other buffer for sending to the service computing device. In other examples, the metadata may be sent separately form the digital asset data.

At 218, the computing device may send the bundled digital asset and metadata to the service computing device. As one example, the asset uploader application 154 may employ an application programming interface (API) for communicating with the management application 122 on the service computing device 102. As one example, the API may be a representational state transfer (REST) API that enables users to interact with the system via the one or more applications on the client computing devices. Accordingly, the asset uploader application may use the API to send the bundled metadata and digital asset data to the management application 122 on the service computing device 102. In response to receiving the metadata and the digital asset data, the management application 122 may generate its own system metadata for the received digital asset. The management application 122 may store the digital asset in the storage 104 and may store the received metadata and its own system metadata in the metadata database.

At 220, in some examples, the computing device may retain the digital asset data for a threshold period in association with the ID. For example, the user may offload the data for the digital asset to the asset uploader application on the client computing device, but may not immediately enter associated metadata for the digital asset. Accordingly, if blocks 206-218 are not completed, blocks 220-224 may be performed. In this situation, the asset uploader application may retain the digital asset for a threshold period of time and following expiration of the threshold period of time may be configured to send automatically the digital asset to the service computing device so that the digital asset is not misplaced. The user may then subsequently enter metadata for the digital asset, such as via the web application.

At 222, the computing device may determine whether the digital asset data has been retained at the computing device for a time exceeding the threshold. If the threshold has been exceeded, the computing device may proceed with sending the digital asset data, the ID information, and any entered metadata to the service computing device at block 218. Otherwise, if the threshold has not been exceeded, the computing device may wait.

At 224, if the threshold time has been exceeded, the computing device may automatically send the digital asset to the service computing device. For example, the user may have loaded the digital asset onto the computing device, but may have not had time to associate any user metadata with the digital asset. Accordingly, the computing device may send the digital asset to the service computing device to ensure that the digital asset is preserved. As one example, the digital asset may be assigned a filename that corresponds to the ID associated with the digital asset, such as the user's badge number, a device serial number, or the like. Based on this filename, the user or another user is able to locate the digital asset after the digital asset has been forwarded to, and stored by, the service computing device.

Figure 3:
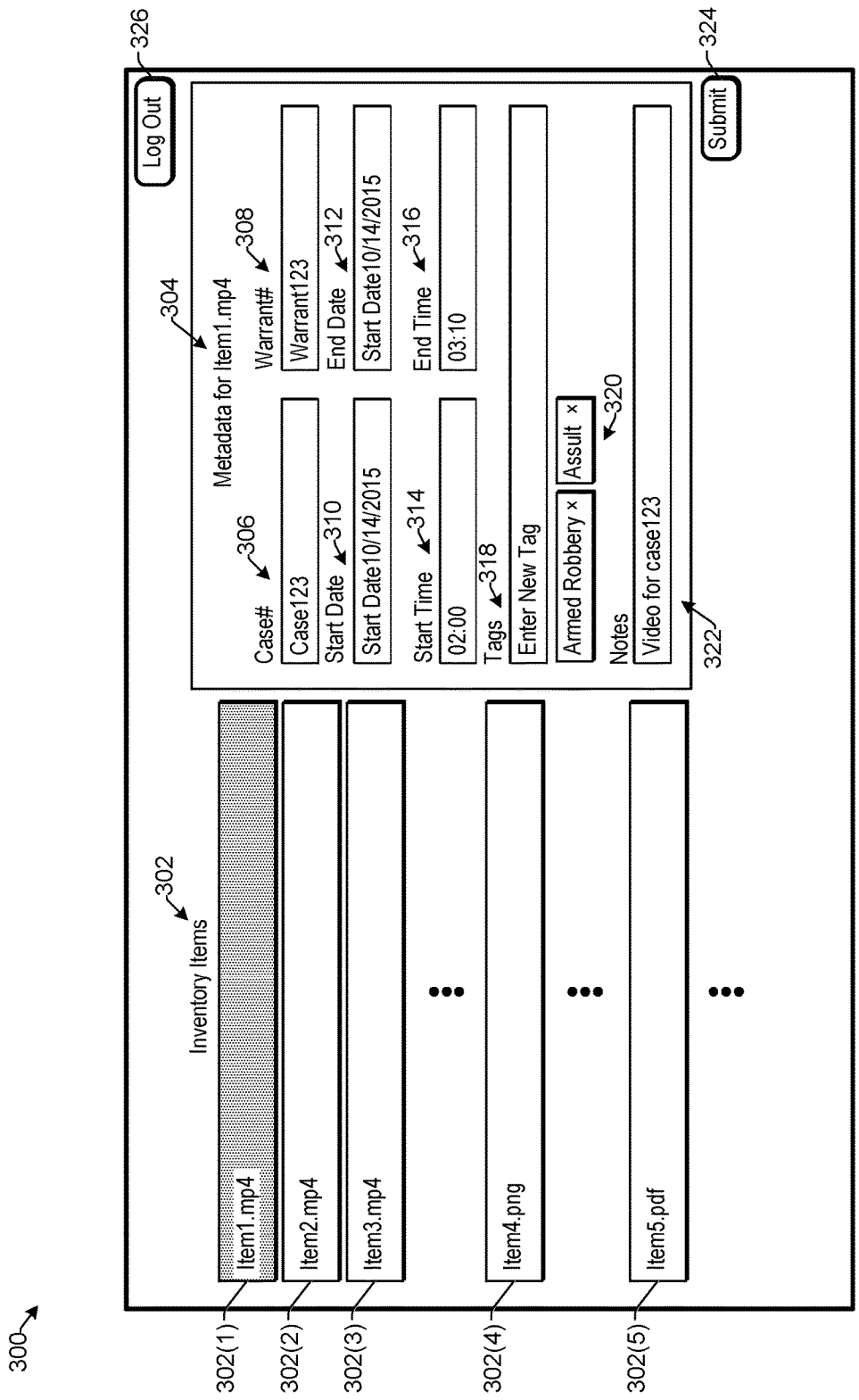
FIG. 3 illustrates an example GUI enabling entry of metadata for a digital asset according to some implementations.

FIG. 3 illustrates an example GUI 300 enabling entry of metadata for a digital asset according to some implementations. For example, the GUI 300 may be presented to a user, such as a law enforcement officer, during providing of digital asset data to the asset uploader application 154, to enable the user to provide user metadata 146 to be associated with the digital asset. Alternatively, the GUI 300, or a similar GUI, may be presented to the user by the web application 156 to enable the user to provide user metadata 146 to be associated with a selected digital asset after the digital asset has been uploaded to the service computing device 102.

In the illustrated example, suppose that the user has added a plurality of inventory items 302, such as a first inventory item 302(1), a second inventory item 302(2), and a third inventory item 302(3), each of which may be a video file, such as an mp4 file, or other video or multimedia file type, and which may also include audio in some examples. Further, suppose that the user has also provided a fourth inventory item 302(4), such as an image file, and a fifth inventory item 302(5), such as a document file. Each of these inventory items 302 may correspond to a separate digital asset 128 that may be uploaded or otherwise sent to the service computing device 102. As one example, suppose that the user has offloaded a plurality of video clips from a body-worn camera, dash camera, or the like, and would like to associate user metadata with one or more of the video clips. The user may select a particular inventory item 302 from the list of inventory items, such as item 302(1) in this example, and may be presented with a metadata input form 304 in the GUI 300 that includes a plurality of entry boxes to enable the user to enter metadata to be associated with the selected inventory item 302(1).

In this example, the metadata form 304 includes an entry box 306 for entering a case number; an entry box 308 for entering a warrant number, if any; an entry box 310 for entering a start date; an entry box 312 for entering an end date; an entry box 314 for entering a start time; an entry box 316 for entering an end time; an entry box 318 for entering metadata tags to be associated with the digital asset, such as metadata tags 320 in this example; and an entry box 322 for entering case notes for the particular case.

In some examples, the time information 314 and 316 may be used during analysis of a respective digital asset, such as when the digital asset is evidence in more than one legal case. As an example, suppose that the digital asset 302(1) is a three-hour video segment, and that the digital asset is relevant to two different legal cases. The user may enter the approximate start times 314 and end times 316 that are relevant to each of the legal cases. When analysis is performed on the video content of the digital asset 302(1), the analysis results of a portion of the digital asset that is relevant to the first legal case may be associated with a first case folder corresponding to the first legal case, and the analysis results of a portion of the digital asset that is relevant to the second legal case may be associated with a second case folder corresponding to the second legal case. Furthermore, depending on the nature of the legal cases, different types of analysis may be performed on the different portions of the digital asset. For example, if the first legal case is an assault case, the analysis may include facial recognition and audio analysis, while if the second legal case is a stolen vehicle case, the analysis may include object recognition, license plate recognition, and the like.

When the user has finished filling in the entry boxes in the metadata form 304, the user may click on or otherwise select a "submit" button 324 or other virtual control to send the user metadata with the selected inventory item 302(1) as a digital asset to the service computing device. If the user decides to wait to finish entering the metadata, the user may select a "logout" button 326. Accordingly, the user may review the inventory items 302 and may enter user metadata as desired for each inventory item 302 that has been provided to the client computing device. In some examples, the user may not believe it is necessary to enter any metadata for particular inventory items 302 and, in such cases, the user may merely submit the inventory items 302 without entering metadata and/or may wait until the asset uploader application automatically sends the inventory items 302 to the service computing device as discussed above with respect to FIG. 2.

Figure 4:
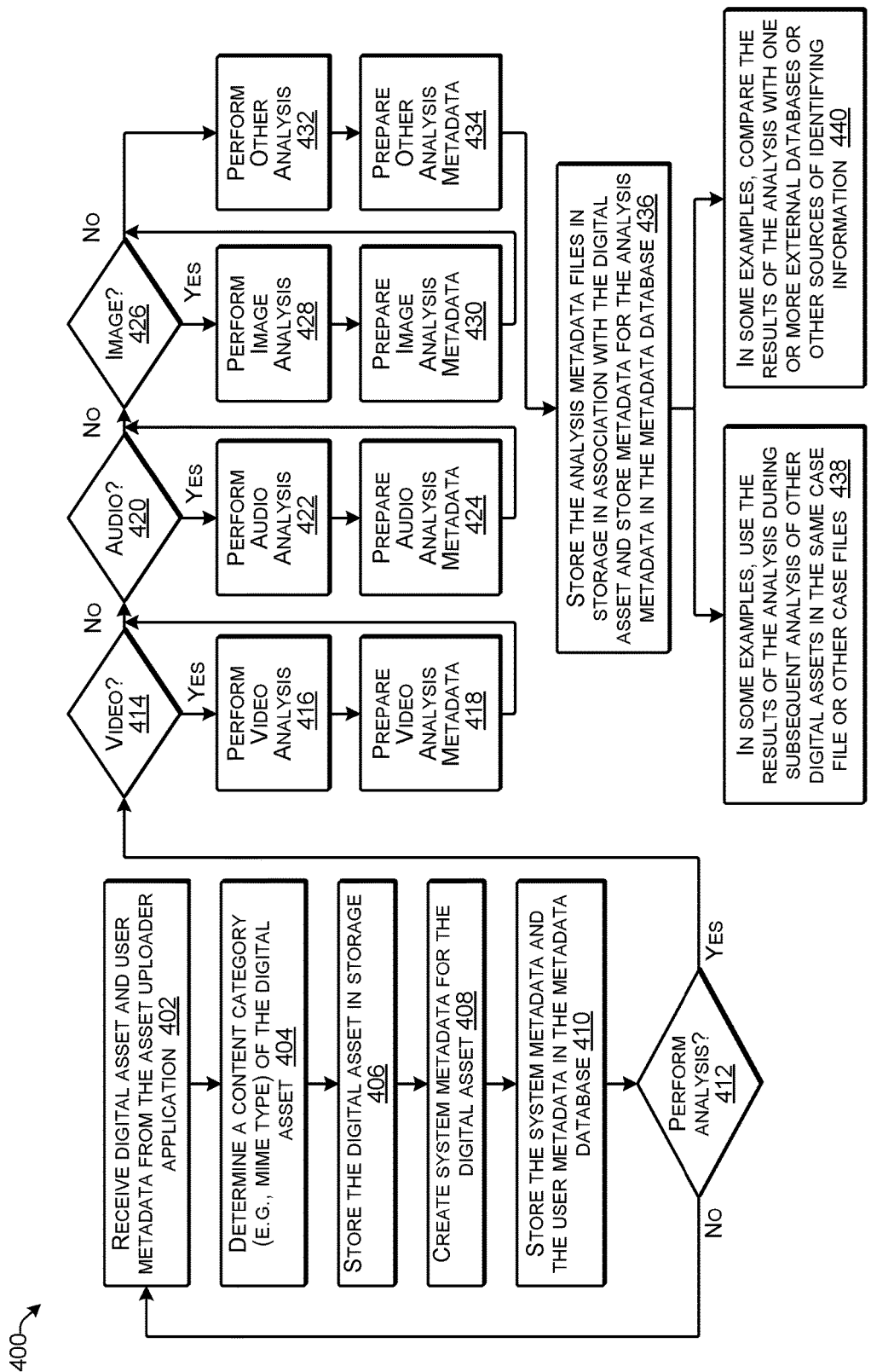
FIG. 4 is a flow diagram illustrating an example process for generating analysis metadata from a digital asset according to some implementations.

FIG. 4 is a flow diagram illustrating an example process 400 for generating analysis metadata from a digital asset according to some implementations. The example process 400 of FIG. 4 may be executed by the service computing device 102 or other suitable computing device.

At 402, the computing device may receive a digital asset and user metadata from the asset uploader application. For example, the service computing device may receive the digital asset from a client computing device through an API or the like.

At 404, the computing device may determine a content category of the content of the digital asset, such as based on a mime type (e.g., file type), by examining the content, or the like. Examples of content categories may include video content, audio content, image content, text content, and so forth. For instance, the content category of the digital asset may be used at least partially to determine whether to perform analysis on the digital asset for extracting analysis metadata, and may further be used for determining the type of analysis to perform.

At 406, the computing device may store the digital asset in storage. For example, the computing device may store the digital asset in the storage in a secure manner, such as in accordance with a storage and retention policy to prevent any changes to the digital asset. In some cases, the computing device may retain a copy of the digital asset in a temporary local storage.

At 408, the computing device may create system metadata for the digital asset. For instance, the system metadata may include various information about the stored digital asset, as enumerated above, and may further indicate the storage location of the digital asset in the storage.

At 410, the computing device may store the system metadata and the user metadata in the metadata database. In some examples, the metadata database may be maintained in a local storage of the service computing device to enable the service computing device to more quickly access and update the metadata database. In other examples, the metadata database may be maintained in the storage 104.

At 412, the computing device may determine whether to perform analysis on the digital asset for generating analysis metadata for the digital asset. In some cases, the analysis might not be performed on every digital asset that is uploaded to the service computing device, while in other cases each digital asset may be analyzed, depending at least partially on available computing capacity. As one example, analysis may be limited to being performed on digital assets that have had user metadata entered for them, such as to indicate that the digital asset will be used as evidence in a legal case. As another example, a user that uploads the digital asset may indicate whether analysis is to be performed on the digital asset. As still another example, the decision whether to perform analysis on the digital asset may be based on the content category of the digital asset or other considerations. If the computing device determines not to perform analysis, the process may return to block 402 to process the next digital asset. On the other hand, if the computing device determines to perform analysis, the process may proceed to block 414. Further, to secure the digital asset, the analysis is performed on a copy of the original digital asset, and not on the digital asset itself. In particular, after the digital asset has been stored in the storage, writing to the digital asset or otherwise changing or deleting the digital asset is not permitted during the retention period for the digital asset.

At 414, the computing device determines whether the digital asset includes video data, e.g., by checking the content category of the digital asset. If not, the process goes to block 420; if so, the process goes to block 416.

At 416, the computing device may perform video analysis of the video content of the digital asset. For example, the computing device may perform facial recognition of people in the video, object recognition of objects visible in the video, license plate recognition of vehicles visible in the video, event detection, video tracking, motion detection, and so forth. Numerous such video content analysis programs are commercially available and will not be described herein in detail. In some examples, the video analysis performed may be based on one or more metadata tags or other case information associated with the digital asset. As one example, as mentioned above, if the legal case is an assault case, the analysis may include facial recognition and audio analysis, while if the legal case is a stolen vehicle case, the analysis may include object recognition, license plate recognition, and the like.

At 418, the computing device prepares video analysis metadata that may have been extracted or otherwise determined from the digital asset. For example, if the facial recognition resulted in recognition of one or more faces, the metadata may indicate the location in the video at which the faces are present, e.g., at what frames or time-based location in the video the faces were detected. Recognized objects, license plates, or the like may similarly be identified. In some examples a text document listing faces, objects, etc., recognized may be prepared. Further, in some cases to additional processing may be performed to attempt to identify recognized faces, objects, license plates, and the like.

At 420, the computing device determines whether the digital asset includes audio data, e.g., based on the content category of the digital asset. If not, the process goes to block 426; if so, the process goes to block 422.

At block 422, the computing device may perform audio analysis of the audio portion of the digital asset. For example, the audio analysis may include audio sound recognition, recognition of key words, voiceprint recognition, and/or voice-to-text translation of the audio data.

At 424, the computing device may prepare audio analysis metadata. As one example, the voice-to-text information extracted from the audio data may be indexed to provide a searchable index of words extracted from the audio data. Additionally a transcript of the audio may be prepared as a text document.

At 426, the computing device may determine whether the digital asset includes image data, such as based on the content category of the digital asset. If not, the process goes to block 432; if so, the process goes to block 428.

At 428, the computing device may perform image analysis on one or more images in the digital asset. For example, the image analysis may be performed on single images, such as accident images, crimes scene images, and so forth. Image analysis may include facial recognition, object recognition, license plate recognition, and so forth, as discussed above. Further, in the case that the digital asset is a video that has already had video analysis, the image analysis may be performed on one or more selected images from the video, and may include types of processing that are different from the video analysis, such as image enhancement, or the like. Further, the image may be compared to a database of mugshots, or the like, to attempt to identify any recognized faces.

At 430, the computing device may prepare image analysis metadata. For example, if facial recognition resulted in recognition of one or more individuals, the metadata may indicate the identity. Similarly, recognized objects may be identified, recognized license plates, and so forth.

At 432, the computing device may perform other analysis on the digital asset. For example, if the digital asset includes textual data, a text document, or other types of data or documents, the computing device may perform analysis on the text, such as optical character recognition, context recognition, keyword recognition, or indexing of the recognized text. As one example, the computing device may extract the words in the document and generate an index of the text, identify particular keywords, or the like. Additionally, or alternatively, the computing device may include artificial intelligence capable of recognizing a context of the text in the digital asset, location information associated with the digital asset, or the like.

At 434, the computing device may prepare the other analysis metadata. For example, depending on the type of metadata extracted from the digital asset, the computing device may index the text, identify the location of keywords, or otherwise place the analysis metadata into a form that is accessible or otherwise useful to a user accessing the metadata such as in an evidence package.

At 436, the computing device may store the analysis metadata files in the storage in association with the digital asset and may store metadata for the analysis metadata in the metadata database in association with the metadata for the digital asset. For example, the analysis results may be text files or other files that may be stored in the storage 104 with the digital asset. For example, if the digital asset has been added to a case folder, the analysis results may be stored in the case folder as metadata for the digital asset. Further metadata for the analysis results may be stored in the metadata database with the other metadata for the digital asset, such as to indicate the type of analysis performed, the storage location of the results, and so forth. Accordingly, implementations herein may automatically generate analysis metadata for individual digital assets that are stored by the digital evidence management system, may associate this analysis metadata with the particular digital asset, and may provide the analysis metadata to a user as part of an evidence data package when requested by the user.

At 438, in some examples, the computing device may use the results of the analysis during subsequent analysis of other digital assets, such as digital assets in the same case folder or other case folders. For instance, the results of the analysis of a digital asset may be correlated and cross-checked with other analysis results of digital assets, such as in the same case or in other cases to locate matches, such as the same faces being recognized, the same objects being recognized, the same license plates being recognized, the same people being identified, and so forth.

At 440, in some examples, the computing device may compare the results of the analysis with one or more external databases or other sources of identifying information. For instance, additional analysis may be performed on the analysis metadata, such as by comparison with external databases, information for unsolved crimes, and other sources of information that may be used to identify the recognized faces, objects, sounds, and the like. As one example, the analysis processing may recognize a license plate of a vehicle and the service computing device may subsequently compare the recognized license plate with a database of stolen vehicle license plates, vehicles registered to suspects in the current case or other cases in the system, and so forth. As another example, if the analysis recognizes a face in a video or image, the service computing device may perform comparison of the recognized face with a mugshot database to attempt to match the recognized face to a known individual. As another example, when the same face is recognized in multiple surveillance videos in an area and proximate in time, movement of the individual may be tracked based on timestamps associated with each video, and as one example, if the individual can be recognized, the movement may be correlated to cellphone location information, or the like, associated with the recognized individual. Numerous other examples will be apparent to those of skill in the art having the benefit of the disclosure herein.

Figure 5:
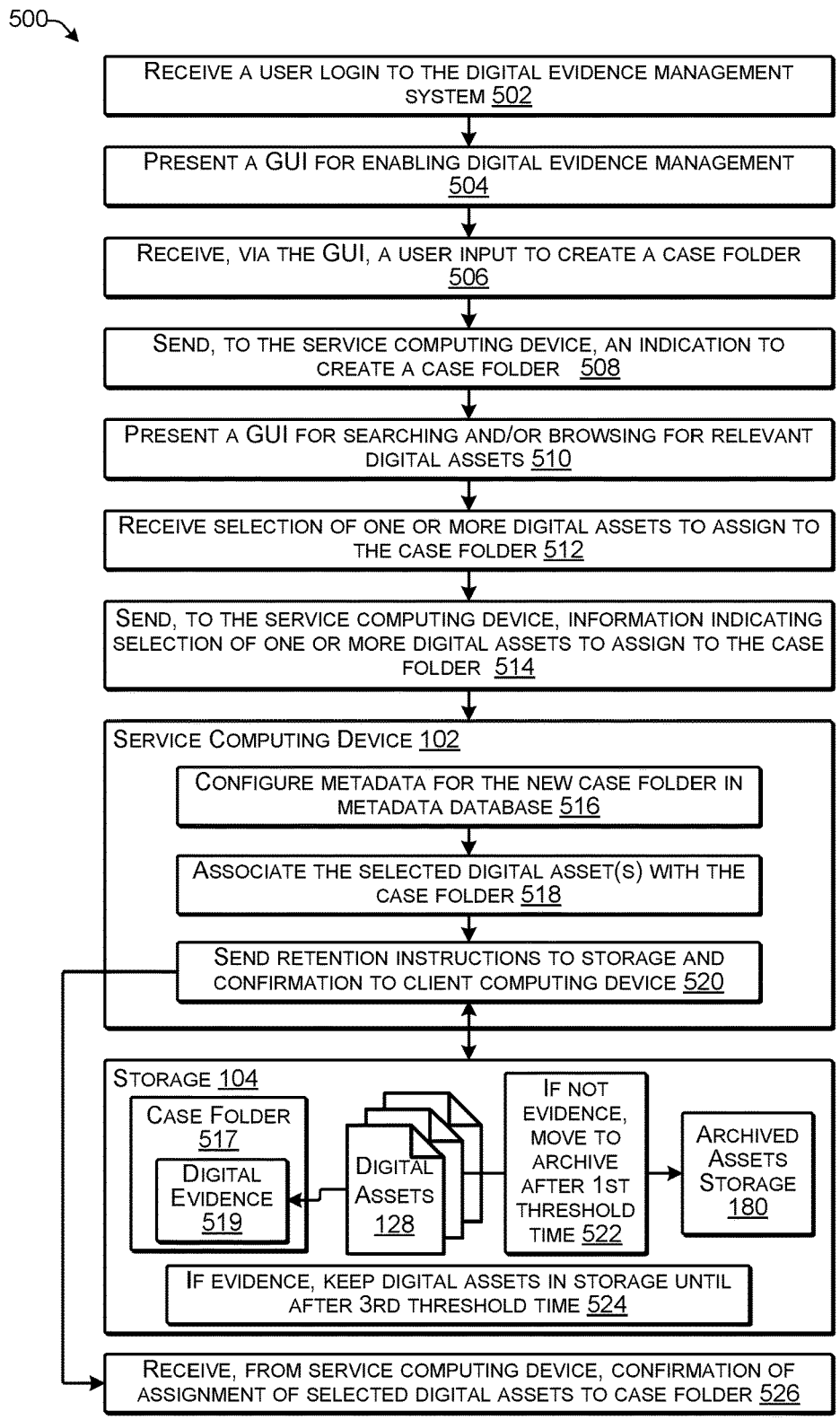
FIG. 5 is a flow diagram illustrating an example process for creating a case folder and for adding digital assets to the case folder according to some implementations.

FIG. 5 is a flow diagram illustrating an example process for creating a case folder and for adding digital assets to the case folder according to some implementations. The process may be executed in part by a client computing device and in part by the service computing device or other suitable computing devices.

At 502, the client computing device may receive a user login to the digital evidence management system. For example, only authorized users may be able to access the digital evidence management system and each user may be required to login before access is granted. As one example, the user may login to the web application discussed above for creating or updating a case folder.

At 504, the client computing device may present a GUI for enabling digital evidence management. For instance, the web application executing on the client computing device may present a GUI including a screen for enabling the user to create case folder, access existing case folders, or the like. In this example, suppose that the user desires to create a new case folder for a new legal case.

At 506, the client computing device may receive via the GUI a user input to create a case folder. For example, the user may interact with the GUI provided via the web application to select one or more virtual controls for creating the case folder.

At 508, the client computing device may send, to the service computing device, an indication to create a new case folder. For example, the client computing device may communicate with the service computing device via an API, and may send to the service computing device information about the user input for creating a case folder.

At 510, the client computing device may present a GUI provided via the web application for searching and or browsing for relevant digital assets to add to the case folder. For example, the user may be able to search for a digital asset according to a date and time associated with the digital asset, a badge ID or other ID associated with the digital asset, keywords, and/or metadata tags associated with the digital asset.

At 512, the client computing device may receive selection of one or more digital assets to assign to, or otherwise associate with, the case folder. For example, the user may use the GUI provided by the web application to select one or more digital assets, such as from a list of digital assets located by searching or browsing for the digital assets.

At 514, the client computing device may send, to the service computing device, information indicating the selection of one or more digital assets to assign to the new case folder.

At 516, the service computing device 102 may configure metadata for a new case folder 517 in the metadata database. In some example, may configure an actual storage area as a case folder 517 for receiving digital assets, such as in an area of the storage 104 designated for storing digital evidence according to an evidence retention policy. In other examples, rather than creating an actual folder in the storage system, the service computing device may create metadata for a virtual case folder and the case folder 517 may be a virtual folder.

At 518, the service computing device 102 may associate selected digital assets with the case folder 517. As one example, the service computing device 102 may instruct the storage 104 to move the selected digital asset(s) from a current storage location to the storage location associated with the evidence storage area for the case folder 517. Thus, by movement to the evidence storage area, the digital assets may become classified as digital evidence 519. As another example, in the case that the case folder 517 is a virtual folder, the service computing device 102 may configure the metadata associated with the selected digital assets to indicate that the selected digital assets are now classified as digital evidence 519 and included in the case folder 517, and may further indicate that the retention policy for the selected digital assets has changed from the digital asset retention policy to the digital evidence retention policy.

At 520, the service computing device 102 may send retention instructions to the storage 104 for the selected digital assets and may further send confirmation to the client computing device that the selected digital assets have been added to the case folder 517. For example, the service computing device 102 may instruct the storage 104 to apply the evidence retention policy to the selected digital asset(s).

At 522, the storage 104 (e.g., the storage controller discussed above) may move one or more digital assets to the archived assets storage 180 if the one or more assets have not been indicated to be evidence after expiration of a first threshold time period. For example, when a digital asset is included in a case folder, the digital asset is classified as digital evidence and the retention policy associated with the particular digital asset changes to the retention policy for digital evidence. The storage 104 may maintain retention policy information for each object stored in the storage 104, including all digital assets. Consequently, the storage 104 may automatically move digital assets 128 to the archived assets storage 180 after the digital assets have been stored in the storage 104 for a period of time equal to or greater than the first threshold time without being classified as digital evidence. Further, in some examples, as discussed above, the archived digital assets may be permanently deleted from the archived assets storage 180 after expiration of a second threshold time.

At 524, on the other hand, if a digital asset become classified as digital evidence, the retention policy for the digital asset is changed, and the storage 104 may keep the digital asset in storage until after expiration of a third threshold time. As mentioned above, the third threshold time may be related to the resolution of the underlying legal case, such as a period of time after the legal case has been resolved. Following the expiration of the third threshold time, the digital asset may be moved to an archived evidence storage (shown in FIG. 1) and may be retained there for a fourth threshold time.

At 526, the client computing device may receive, from the service computing device 102, a confirmation of the assignment of the selected digital asset(s) to the new case folder. The user may continue to add digital assets to the case folder, may access a different folder, or may logout.

Figure 6:
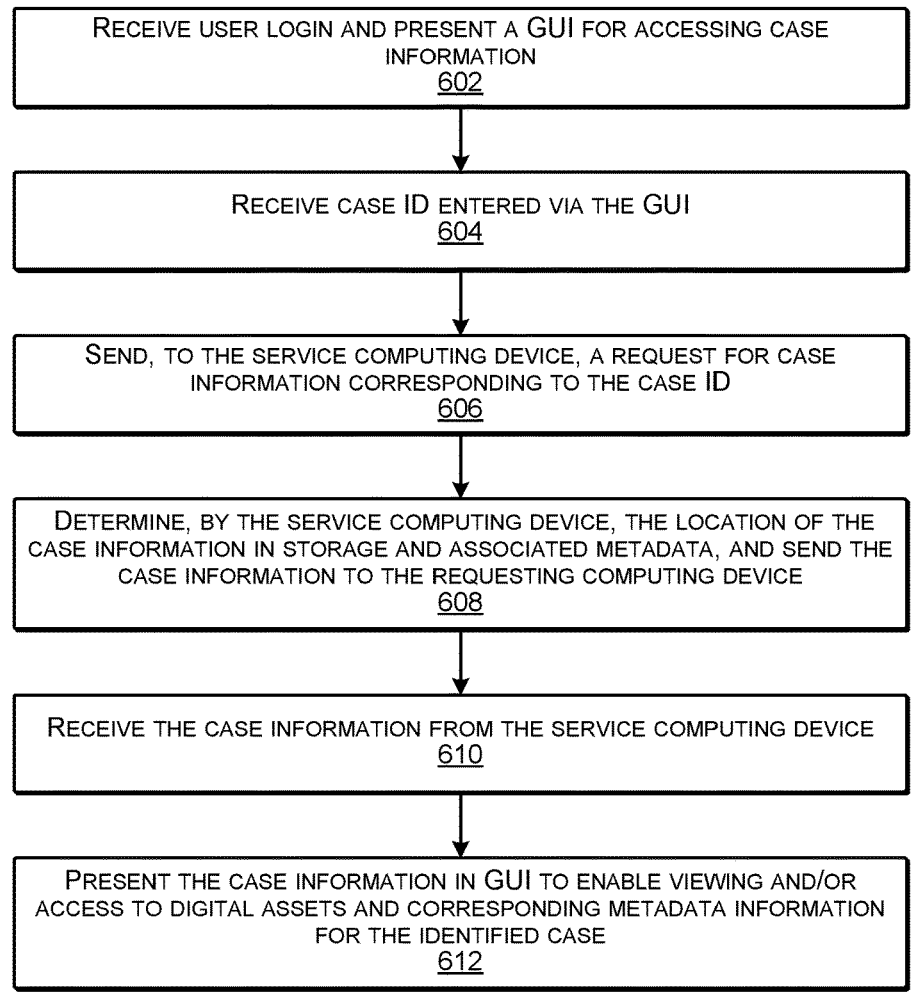
FIG. 6 is a flow diagram illustrating an example process for presenting digital evidence according to some implementations.

FIG. 6 is a flow diagram illustrating an example process for presenting digital evidence according to some implementations. The process may be executed in part by a client computing device and in part by the service computing device or other suitable computing devices.

At 602, the client computing device may receive a user login and may present a GUI for accessing case information. For example, the user may be authorized to access case information for a particular case or for multiple cases. In some examples, the user may use the viewer application 158 discussed above to access an evidence package associated with a legal case. For instance, the evidence package may include a case folder and some metadata associated with the digital assets in the case folder, such as a chain of custody log.

At 604, the client computing device may receive a case ID entered via the GUI. For example, the user may select, enter, or otherwise indicate a case ID corresponding to an evidence package that the user would like to view.

At 606, the client computing device may send, to the service computing device, a request for case information corresponding to the entered case ID.

At 608, the service computing device determines the location of the case information in storage from the case metadata and sends the case information to the requesting client computing device. In some examples, the service computing device may assemble an evidence package that includes the case folder, i.e., a copy of all the digital assets that have been added to the case folder as digital evidence, and the analysis metadata associated with each digital asset in the case folder.

At 610, the client computing device receives the case information from the service computing device. In some examples, the case information may merely be metadata about the information in the evidence package, while in other examples, the case information may be some or all of the evidence package.

At 612, the client computing device presents the case information in a GUI to enable viewing and/or access to the digital assets in the case folder and corresponding metadata information. In some examples, the case information may be presented as read-only information. Furthermore, in the situation that the evidence package is not downloaded to the client computing device, but instead information about the evidence package is presented on the client computing device, the user may select particular parts of the evidence package for downloading and viewing or otherwise accessing.

Figure 7:
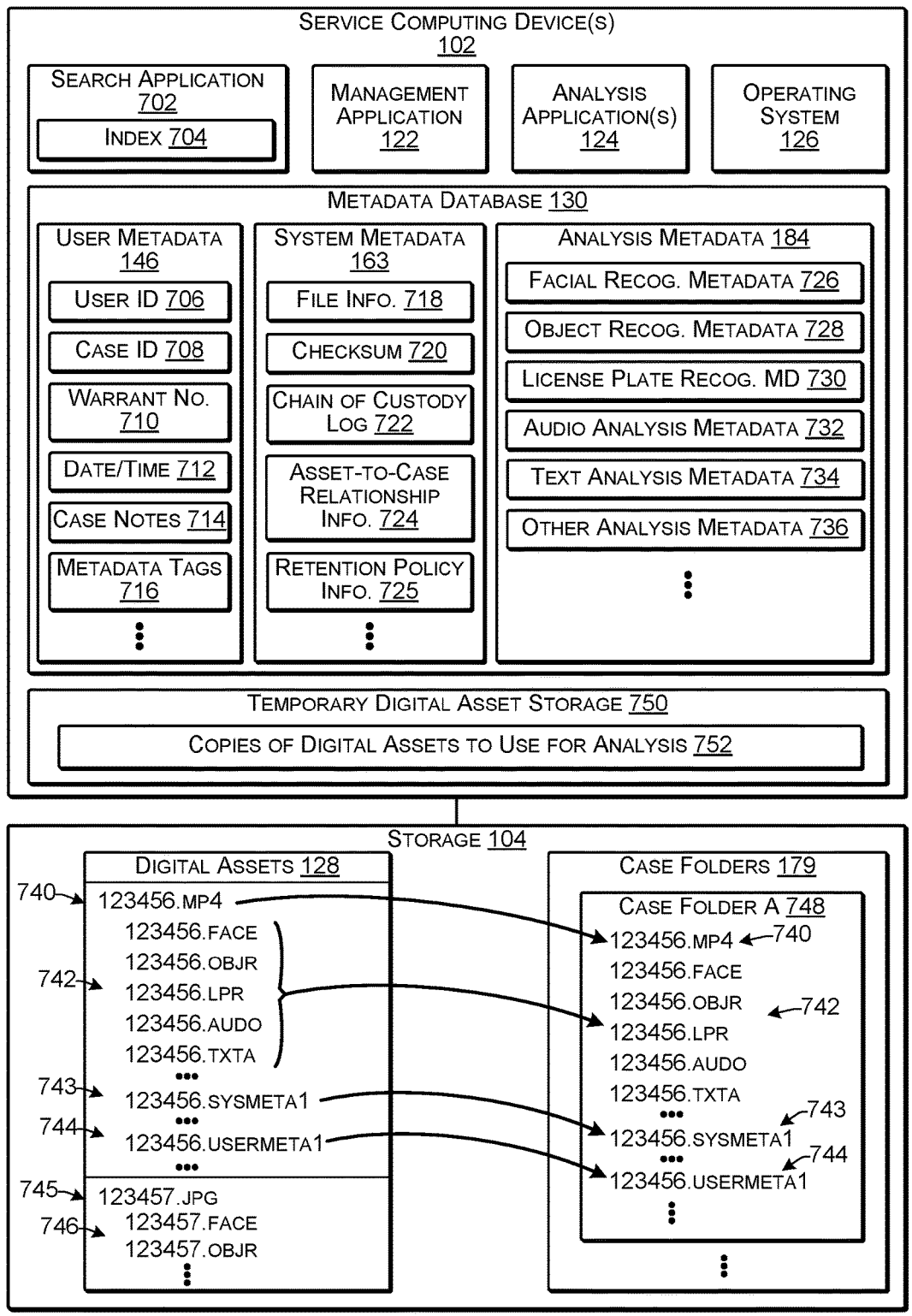
FIG. 7 illustrates example configurations of the service computing device and storage according to some implementations.

FIG. 7 illustrates an example configuration of the service computing device 102 and the storage 104 according to some implementations. In this example, the service computing device 102 may include the management application 122, the analysis application(s) 124, the operating system 126, and the metadata database 130. In addition, the service computing device 102 may include a search application 702 including one or more search indexes 704. For example, the search application 702 may generate the one or more search indexes 704 to enable searching of the digital assets, case folders, and the metadata corresponding to these data objects. The search application 702 may also serve as a search server for responding to searching queries from the client computing devices.

In some examples, the metadata database 130 may be a document-oriented database; however, implementations herein are not limited to such. The metadata database 130 may include, for each digital asset, at least some of the user metadata 146, the system metadata 163, and/or the analysis metadata 184. As mentioned above, the user metadata may include a user ID 706, a case ID 708, a warrant number 710, date and time information 712, case notes 714, and metadata tags 716. In addition, the system metadata may include file information 718, a checksum 720, a chain of custody log 722, and asset-to-case relationship information 724, and retention policy information 725.

For example, the file information 718 may include storage size of the corresponding asset, file type, time at which the file was received by the service computing device 102, ownership information, and so forth. Furthermore, the checksum 720 may be generated when the digital asset is received and may be used to verify that the digital asset is not changed while stored in the storage 104.

A chain of custody log 722 may be maintained for each digital asset. The chain of custody log 722 may be automatically generated as a record of the chain of custody for the respective digital asset. The chain of custody log 722 may include a record of every action taken with respect to a digital asset, and may indicate who performed the action, when the action was performed, and what the action was, e.g., file access, addition, deletion, etc. For example, every action taken in the system with respect to a digital asset may pass through a central portal, which enables the action be logged in the chain of custody log 722. Thus, the chain of custody log 722 may indicate who has viewed a file, changed a file, etc., as well as when the event occurred, what the changes were, and so forth. In some examples, the chain of custody log 722 may be maintained with the system metadata 163, while in other examples, the chain of custody log 722 may be stored in the storage 104 in association with the respective digital asset.

Furthermore, the asset-to-case relationship information 724 may indicate which digital assets have been associated with which case folders. For example, a particular digital asset 128 may be associated with more than one legal case and therefore may be associated with more than one case folder in the storage 104. Accordingly, by maintaining the relationships between assets and any associated case folders, the service computing device 102 is able to determine the appropriate retention period for individual assets and associated metadata. Further, the retention policy information 725 may indicate whether the digital asset retention policy applies or the digital evidence retention policy applies. Furthermore, the service computing device 102 may provide the asset-to-case relationship information 724 and/or the retention policy information 725 to the storage 104 to enable the storage 104 to independently control the retention periods for the digital assets and corresponding analysis metadata that may be stored in association with the digital assets.

The analysis metadata 184 may include facial recognition metadata 726, object recognition metadata 728, license plate recognition metadata 730, audio analysis metadata 732, text analysis metadata 734, and other analysis information 736. For example, other types of analysis information may include analysis of computer or cell phone data, GPS or other location information data, social network and microblog data, telephone call data, vehicle computer system data, and various other types of data as enumerated above.

When the analysis of a digital asset results in a file, such as a text file, or the like, that provides the results of the analysis, the analysis metadata file may be stored in the storage 104 in association with the respective digital assets, and the respective metadata 726-736 stored in the metadata database 130 may be metadata about the analysis metadata file. As mentioned above, in some examples each digital asset may be given a file name including a first portion that is unique or otherwise individually distinguishable within the evidence management system. Furthermore, for the results of the analysis, each analysis result file may be given the same file name as the digital asset, but with a different file name extension that may correspond to the type of analysis that produced the file.

In the illustrated example, suppose that a digital asset 740 is a video file and has been assigned the file name 123456.mp4. For example, suppose that the first portion of the file name 123456 is unique within the evidence management system and the second portion, mp4 is an extension indicative of the mime type of the digital asset. Subsequently, when analysis is performed on the digital asset, one or more analysis metadata files 742 may use the same first portion of the file name as the digital asset with a different second portion file name extension. For example, a result of the facial recognition analysis may be named 123456.face; a result of the object recognition analysis may be named 123456.objr; a result of the license plate recognition analysis may be named 123456.lpr; a result of the audio analysis may be named 123456.audo; a result of a text analysis may be named 123456.txta; and so forth.

In addition, the system metadata 163 and the user metadata 146 may also be stored in the storage 104 in association with the corresponding digital asset. For example, the system metadata files and user metadata files may be stored with a file name having a first portion that is the same as the first portion of the file name of the digital asset, but with a different file name extension that may correspond to the type of metadata, or the like. Thus, the system metadata 743 may be stored as, e.g., 123456.sysmeta1, . . . , or the like, and the user metadata 744 may be stored as, e.g., 123456.usermeta1, . . . , or the like. Similarly, another digital asset 745 that is an image file may be named 123457.jpg, and the analysis result files 746 for this digital asset may include a facial recognition analysis result 123457.face and an object recognition analysis result 123457.objr.

In addition, the analysis results files for a particular digital asset may be added to a case folder when the digital asset itself is added to a case folder. For instance, suppose that a user adds the digital asset 740 to a case folder A 748, such as discussed above with respect to FIG. 5. In response, in addition to moving the selected digital asset 740 to the case for 748, the system may also automatically move any analysis metadata files 742 to the same case folder 748, and may also move the system metadata files 743 and the user metadata files 744 to the same case folder 748.

Additionally, as mentioned above, a digital asset may be relevant to more than one case and, therefore, may be included in more than one case folder. In some instances, when provided, the date and time metadata 712 may be used during analysis of a respective digital asset when the digital asset is relevant to more than one legal case. The user may enter the approximate start times and end times that are relevant to each of the cases. When analysis is performed on the content of the digital asset, the analysis results of a portion of the digital asset that is relevant to the first legal case may be associated with a first case folder corresponding to the first legal case, and the analysis results of a portion of the digital asset that is relevant to the second legal case may be associated with a second case folder corresponding to the second legal case. Furthermore, different types of analysis may be performed on the same digital asset for different cases and therefore the analysis results relevant to a first case might not be included with the analysis results included in a case folder for a different case. Accordingly, in some examples, the analysis metadata files may be partitioned according to the different cases to which the analysis metadata files are relevant.

In addition, the service computing device 102 may include a temporary digital asset storage 750 that may be part of the computer readable media discussed above, and which may be local to the service computing device 102. For example, the service computing device 102 may use the temporary digital asset storage 750 to temporarily store copies of digital assets 752 to use for analysis of the digital assets as discussed above with respect to FIG. 4. Furthermore, while FIG. 7 illustrates one example configuration of the service computing device 102 and the storage 104, numerous other possible configurations will be apparent to those of skill in the art having the benefit of the disclosure herein.

Various instructions, processes, and techniques described herein may be considered in the general context of computer-executable instructions, such as program modules and applications stored on computer-readable media, and executed by the processor(s) herein. Generally, program modules and applications include routines, programs, objects, components, data structures, executable code, etc., for performing particular tasks or implementing particular abstract data types. These program modules, applications, and the like, may be executed as native code or may be downloaded and executed, such as in a virtual machine or other just-in-time compilation execution environment. Typically, the functionality of the program modules and applications may be combined or distributed as desired in various implementations. An implementation of these programs and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors; and
one or more non-transitory computer-readable media maintaining executable instructions, which, when executed by the one or more processors, program the one or more processors to perform operations comprising:
receiving a digital asset and first metadata that is associated with the digital asset;
determining a content category of content of the digital asset;
performing, on the digital asset, a first analysis application of a plurality of analysis applications, wherein the first analysis application is determined at least based on the determined content category of the content of the digital asset;
generating a second metadata which includes an analysis result of the first analysis application performed on the digital asset;
storing the first metadata and the second metadata in association with the digital asset;
receiving, from a client device, an indication to associate the digital asset with a case folder;
associating the digital asset and the analysis result with the case folder; and
classifying the digital asset as digital evidence based at least on receiving the indication.

2. The system as recited in claim 1, the operations further comprising:
generating a third metadata including information about the second metadata including the analysis result; and
storing the third metadata in association with the first metadata.

3. The system as recited in claim 2, further comprising a local metadata database and a storage system, wherein:
the first metadata and the third metadata are stored in the local metadata database; and
the digital asset and the second metadata including the analysis result are stored in the storage system over a network.

4. The system as recited in claim 1, the operations further comprising:
determining the content category of the content of the digital asset by determining whether the digital asset includes at least one of video content, audio content, image content, or text content; and
performing the first analysis application includes performing at least one of video analysis on the video content, audio analysis on the audio content, image analysis on the image content, or text analysis on the text content.

5. The system as recited in claim 4, further comprising at least one of:
the video analysis includes at least one of facial recognition, object recognition, license plate recognition, event detection, motion detection, or video tracking;
the audio analysis includes at least one of voice-to-text translation, sound recognition, voice pattern recognition, or recognition of key words;
the image analysis includes at least one of facial recognition, object recognition, or license plate recognition; or
the text analysis includes at least one of optical character recognition, context recognition, keyword recognition, or indexing of the recognized text.

6. The system as recited in claim 1, the operations further comprising:
based at least on associating the digital asset and the analysis result with the case folder, changing a retention policy associated with the digital asset.

7. The system as recited in claim 6, wherein:
prior to associating the digital asset with the case folder, the retention policy for the digital asset includes a first threshold time before the digital asset is moved to archived assets and a second threshold time before the digital asset is deleted; and
following associating the digital asset with the case folder, the retention policy for the digital asset includes a third threshold time before the digital asset is moved to archived evidence, the third threshold time being based at least on a resolution of a legal case corresponding to the case folder, and a fourth threshold time before the digital asset is deleted.

8. The system as recited in claim 1, the operations further comprising:
receiving, from a client device, a request for the case folder; and
sending, to the client device, information related to the digital asset, the second metadata including the analysis result, and a chain of custody log including a record of one or more accesses from one or more client computers to the digital asset.

9. The system as recited in claim 1, the operations further comprising maintaining a chain of custody log for the digital asset, the chain of custody log including:
a record of one or more accesses from one or more client computers to the digital asset;
an indication of a respective time when the one or more accesses took place; and
a respective user identifier associated with the one or more accesses.

10. The system as recited in claim 1, the operations further comprising receiving user data as the first metadata, the user data indicating at least one of:
a start time in the content of the digital asset for performing analysis on the digital asset;
an end time in the content of the digital asset for performing analysis on the digital asset; or
at least one indicator of a type of analysis to perform on the content of the digital asset.

11. The system as recited in claim 1, the operations further comprising:
assigning a file name to the digital asset including a first file name portion that is individually distinguishable within the system, the file name including a second file name portion corresponding to a mime type of the digital asset; and
assigning a file name to the second metadata including the analysis result including the same first file name portion, and including a second file name portion that is different from the second file name portion assigned to the digital asset.

12. A method comprising:
receiving, by one or more processors, a digital asset and first metadata that is associated with the digital asset;
determining a content category of content of the digital asset;
performing, on the digital asset, a first analysis application of a plurality of analysis applications, wherein the first analysis application is determined at least based on the determined content category of the content of the digital asset;
generating a second metadata which includes an analysis result of the first analysis application performed on the digital asset;
storing the first metadata and the second metadata in association with the digital asset and storing third metadata including information about the second metadata in association with the first metadata; and
maintaining a chain of custody log for the digital asset, the chain of custody log including:
a record of one or more accesses from one or more client computers to the digital asset;
an indication of a respective time when the one or more accesses took place; and
a respective user identifier associated with the one or more accesses.

13. The method as recited in claim 12, further comprising:
storing the first metadata and the third metadata in a local metadata database; and
storing the digital asset and the second metadata including the analysis result in a storage system over a network.

14. One or more non-transitory computer-readable media storing instructions that, when executed by one or more processors, program the one or more processors to:
receive a digital asset and first metadata that is associated with the digital asset;
determine a first content category of content of the digital asset;
perform, on the digital asset, a first analysis application of a plurality of analysis applications, wherein the first analysis application is determined at least partially based on the determined first content category of the content of the digital asset;
generate a second metadata which includes a first analysis result of the first analysis application performed on the digital asset;
store the first metadata and the second metadata in association with the digital asset; and
maintain a chain of custody log for the digital asset, the chain of custody log including:
a record of one or more accesses from one or more client computers to the digital asset;
an indication of a respective time when the one or more accesses took place; and
a respective user identifier associated with the one or more accesses.

15. The one or more non-transitory computer-readable media as recited in claim 14, wherein the one or more processors are further programmed to:
generate a third metadata including information about the second metadata including the first analysis result;
store the first metadata and the third metadata in a local metadata database; and
store the digital asset and the second metadata including the first analysis result in a storage system over a network.

16. The one or more non-transitory computer-readable media as recited in claim 15, wherein the one or more processors are further programmed to:
determine a second content category of the content of the digital asset, wherein the second content category is for a category of content different from the first content category;
perform, on the digital asset, a second analysis application of the plurality of analysis applications, which is determined at least based on the determined second content category of the content of the digital asset;
generate a fourth metadata which includes a second analysis result of the second analysis application performed on the digital asset; and
store the fourth metadata including the second analysis result in the storage system in association with the digital asset.

17. The one or more non-transitory computer-readable media as recited in claim 16, wherein the one or more processors are further programmed to:
generate a fifth metadata including information about the fourth metadata including the second analysis result; and
store the fifth metadata in the local metadata database in association with the first metadata.

18. The one or more non-transitory computer-readable media as recited in claim 14, wherein the one or more processors are further programmed to:
- receive, from a client device, an indication to associate the digital asset with a case folder;
- associate the digital asset and the second metadata including the first analysis result with the case folder; and
- based at least on associating the digital asset and the second metadata including the first analysis result with the case folder, changing a retention policy associated with the digital asset.

19. The one or more non-transitory computer-readable media as recited in claim 14, wherein the one or more processors are further programmed to:
- assign a file name to the digital asset including a first file name portion that is individually distinguishable from other file names of other digital assets, the file name including a second file name portion corresponding to a mime type of the digital asset; and
- assign a file name to the second metadata including the first analysis result including the same first file name portion, and including a second file name portion that is different from the second file name portion assigned to the digital asset.

* * * * *